United States Patent
Sawyer et al.

(10) Patent No.: US 7,298,829 B2
(45) Date of Patent: *Nov. 20, 2007

(54) COMMUNICATIONS DEVICES INCLUDING TEST CIRCUITS AND RELATED CIRCUITS AND METHODS

(75) Inventors: Charlie Sawyer, Orlando, FL (US);
Isaac D. White, Orlando, FL (US);
James E. Dickens, Ocoee, FL (US);
Blake R. Urban, Lenoir, NC (US);
Kevin Forsberg, Orlando, FL (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 1059 days.

This patent is subject to a terminal disclaimer.

(21) Appl. No.: 10/419,409

(22) Filed: Apr. 21, 2003

(65) Prior Publication Data

US 2004/0208294 A1    Oct. 21, 2004

(51) Int. Cl.
*H04M 1/24* (2006.01)
*H04M 3/08* (2006.01)
*H04M 3/22* (2006.01)

(52) U.S. Cl. .............................. 379/29.11; 379/29.01; 379/27.06; 379/27.07

(58) Field of Classification Search ............... 379/1.01, 379/15.01, 17, 19, 21, 22.06, 22.07, 26.01, 379/27.01, 27.05, 27.06, 27.07, 29.01, 29.05, 379/29.11, 30; 340/825.36, 825.4; 324/500, 324/524, 555–556; 714/733–734

See application file for complete search history.

(56) References Cited

U.S. PATENT DOCUMENTS

| | | | | |
|---|---|---|---|---|
| 3,711,767 | A | * | 1/1973 | Campbell et al. ............ 324/538 |
| 4,513,176 | A | * | 4/1985 | Fostveit ......................... 379/9 |
| 4,796,289 | A | * | 1/1989 | Masor ..................... 379/27.07 |
| 4,827,498 | A | * | 5/1989 | Ross ....................... 379/27.08 |
| 4,841,559 | A | * | 6/1989 | Curtis ..................... 379/27.01 |
| 5,062,131 | A | * | 10/1991 | Kanare et al. ................ 379/33 |
| 5,353,327 | A | * | 10/1994 | Adari et al. .................. 379/22 |
| 5,613,873 | A | | 3/1997 | Bell, Jr. |
| 5,751,789 | A | * | 5/1998 | Farris et al. ............. 379/32.04 |
| 5,974,139 | A | | 10/1999 | McNamara et al. ........ 379/399 |
| 6,795,552 | B1 | | 9/2004 | Stanush et al. |
| 7,073,108 | B2 | * | 7/2006 | Sawyer et al. .............. 714/724 |

* cited by examiner

*Primary Examiner*—Quoc Tran
(74) *Attorney, Agent, or Firm*—Meyers Bigel Sibley & Sajovec (57) ABSTRACT

A communications device can include first and second input terminals configured to provide coupling with respective first and second conductors of a communications line, and first and second signal conductors respectively coupled with the first and second input terminals. A communications circuit can be coupled to the first and second signal conductors wherein the communications circuit provides a communications interface. A test switch can be configured to electrically couple the first and second signal conductors responsive to activation thereof, and an indicator circuit can be configured to provide indication of a completed electrical circuit through the test switch. Related circuits and methods are also discussed.

39 Claims, 5 Drawing Sheets

COMMUNICATIONS DEVICES INCLUDING TEST CIRCUITS AND RELATED CIRCUITS AND METHODS

CROSS REFERENCE TO RELATED APPLICATIONS

The present application is related to application Ser. No. 10/419,415 entitled "Communications Jacks Including Test Circuits And Related Circuits And Methods" and filed concurrently herewith. The disclosure of application Ser. No. 10/419,415 is hereby incorporated herein in its entirety by reference.

FIELD OF THE INVENTION

The present invention generally relates to communications, and more particularly to test circuits and related methods.

BACKGROUND

A residence is conventionally wired for telephone service using twisted wire pairs according to the RJ11 standard. The telephone service provider generally provides service to a network interface device (NID) outside the residence, and service for a telephone line is provided using a communications line including one tip conductor and one ring conductor running from the telephone service provider's central office to the network interface device of the residence. Conventionally, the tip and ring conductors comprise twisted wires. Within the residence, a plurality of communications lines run from the network interface device to respective telephone jacks within the residence. Each of these communications lines within the residence includes a tip conductor and a ring conductor. In addition, one or more communications devices, such as telephones, modems, computers, caller identification units, and/or facsimile machines, may be detachably coupled to one or more telephone jacks.

When a residential customer experiences trouble with phone service, the telephone service provider is generally responsible for repairs required outside the residence, and the residential customer is generally responsible for repairs required inside the residence. More particularly, the network interface device is usually the demarcation point with the telephone service provider being responsible for repairs outside the residence to the network interface device, and with the residential customer being responsible for repairs inside the residence to the network interface device. Moreover, regardless of where a problem may exist, the problem should be isolated before a repair can be performed either inside or outside the residence.

A problem outside the residence can be isolated by decoupling the outside communications line from the network interface device and testing the single pair of (tip and ring) conductors. A problem inside the residence, however, may be more difficult to isolate because there are likely to be a plurality of communications lines and communications devices inside the residence, and a failure of any one communications line or device may result in diminished service and/or service failure.

When a problem with service occurs, a technician (either independent or from the telephone service provider) may readily have the skills and tools to effectively diagnose and correct the problem. When relying on a technician, however, the customer may have to wait for an available technician delaying restoration of service and/or the customer may incur expense if the problem is inside the residence. Accordingly, a customer may wish to first attempt to isolate and possibly fix the problem before requesting service from a technician to reduce time without service and/or reduce cost. A customer, however, may not have the skills and/or tools to effectively diagnose or fix the problem.

Regardless of who attempts to fix a service problem, once it is determined that the outside line is functioning properly, the inside communications lines and devices should be isolated and tested separately until the problem line and/or device is isolated. Once the problem line and/or device has been isolated, it can be repaired, replaced, or removed.

If the customer attempts to diagnose and repair the problem, customer service personnel of the telephone service provider may be contacted to guide the customer through the process. First, the customer can take a working telephone to the NID and check for a dial tone there to determine if the problem is inside or outside the residence. If a dial tone can be obtained at the NID, the problem is inside. Then all communications devices inside the residence can be unplugged. If a working telephone can obtain a dial tone at each telephone jack, the problem is with one of the communications devices that has been unplugged. The communications devices can then be plugged in individually to determine which device is not functioning properly. Even if the customer manages all of the steps above, many customers may have difficulty diagnosing and fixing a problem that exists with communications lines inside the residence.

SUMMARY

According to embodiments of the present invention, a communications device may include first and second input terminals configured to provide coupling with respective first and second conductors of a communications line, and first and second signal conductors respectively coupled with the first and second input terminals. A communications circuit may be coupled to the first and second signal conductors wherein the communications circuit provides a communications interface. In addition, a test switch may be configured to electrically couple the first and second signal conductors responsive to activation thereof, and an indicator circuit may be configured to provide indication of a completed electrical circuit through the test switch. In addition, the indicator circuit can be configured to provide indication of a completed electrical circuit through the test switch while the communications circuit is maintained on-hook.

More particularly, the test switch can be configured to be manually activated, and the indicator circuit can include a battery and at least one light emitting diode electrically coupled in series with the test switch and the communications circuit. The test switch, the battery, and the at least one light emitting diode can be provided on a bridge between the first and second signal conductors so that electrical couplings between the first and second input terminals and the communications circuit through the first and second signal conductors are free of the test switch, the battery, and the at least one light emitting diode. The at least one diode can be visible from a surface of the communications device. In addition, the at least one light emitting diode comprises two parallel connected light emitting diodes connected in opposing directions.

The at least one light emitting diode may include at least a first light emitting diode connected along the first signal conductor in series between the first input terminal and the communications circuit. The at least one light emitting diode may include at least a second light emitting diode connected along the second signal conductor in series between the second input terminal and the communications circuit.

In addition, the first and second input terminals can be configured to be coupled to a communications port, such as a communications port according to the RJ11 standard. Moreover, the first and second input terminals can be configured to provide a detachable electrical coupling with respective first and second conductors of a communications port.

The communications circuit may provide a communications interface for at least one of audio telephone communications, facsimile communications, caller identification communications, computer communications, modem communications, alarm system communications, and/or local area network communications. The communications device may also include an isolation switch on the first signal conductor coupled in series between the first input terminal and the test switch wherein the isolation switch is normally closed and wherein the isolation switch is opened responsive to activation thereof.

According to additional embodiments of the present invention, a test circuit may be provided for a communications device wherein the communications device includes first and second signal conductors coupled between first and second input terminals and a communications circuit providing a communications interface. The test circuit may include a test switch configured to electrically couple the first and second signal conductors responsive to activation thereof, and an indicator circuit configured to provide indication of a completed electrical circuit through the test switch. In addition, the indicator circuit can be configured to provide indication of a completed electrical circuit through the test switch while the communications circuit is maintained on-hook.

The test switch may be configured to be manually activated, and the indicator circuit may include a battery and at least one light emitting diode electrically coupled in series with the test switch and the communications circuit. In addition, the test switch, the battery, and the at least one light emitting diode can be provided on a bridge between the first and second signal conductors so that electrical couplings between the first and second input terminals and the communications circuit through the first and second signal conductors are free of the test switch, the battery, and the at least one light emitting diode. Moreover, the at least one diode may be visible from a surface of the communications device. In addition, the at least one light emitting diode may include two parallel connected light emitting diodes connected in opposing directions.

The at least one light emitting diode may include at least a first light emitting diode connected along the first signal conductor in series between the first input terminal and the communications circuit. The at least one light emitting diode may also include at least a second light emitting diode connected along the second signal conductor in series between the second input terminal and the communications circuit.

The first and second signal input terminals may be configured to be coupled to a communications port, such as a communications port according to the RJ11 standard. The first and second input terminals may also be configured to provide a detachable electrical coupling with respective first and second conductors of a communications port. In addition, the communications circuit may provide a communications interface for at least one of audio telephone communications, facsimile communications, caller identification communications, computer communications, modem communications, alarm system communications, and/or local area network communications. In addition, the test circuit may also include an isolation switch on the first signal conductor between the test switch and the first input terminal wherein the isolation switch is normally closed and wherein the isolation switch is opened responsive to activation thereof.

According to still additional embodiments of the present invention, methods may be provided for testing a communications device including first and second signal conductors coupled between first and second input terminals and a communications circuit providing a communications interface. The method may include electrically coupling the first and second signal conductors of the communications device through a test switch, and providing indication of a completed electrical circuit through the test switch. In addition, providing indication of a completed electrical circuit may include providing indication of a completed electrical circuit through the test switch while the communications circuit is maintained on hook.

Moreover, electrically coupling the first and second signal conductors comprises manually activating the test switch. In addition, electrically coupling the first and second signal conductors may include electrically coupling a series connection of a battery and at least one light emitting diode through the test switch. For example, the test switch, the battery, and the at least one light emitting diode can be provided on a bridge between the first and second signal conductors so that electrical couplings between the first and second input terminals and the communications circuit through the first and second signal conductors are free of the test switch, the battery, and the at least one light emitting diode. In addition, the at least one diode can be visible from a surface of the communications device. The at least one light emitting diode may also include two parallel connected light emitting diodes connected in opposing directions.

The at least one light emitting diode may include at least a first light emitting diode connected along the first signal conductor in series between the first input terminal and the communications circuit. In addition, the at least one light emitting diode may include at least a second light emitting diode connected along the second signal conductor in series between the second input terminal and the communications circuit.

The first and second signal input terminals can be configured to provide a coupling to a communications port, such as a communications port according to the RJ11 standard. Moreover, the first and second input terminals can be configured to provide a detachable electrical coupling with respective first and second conductors of a communications port. In addition, the communications circuit may provide a communications interface for at least one of audio telephone communications, facsimile communications, caller identification communications, computer communications, modem communications, alarm system communications, and/or local area network communications. Testing the communications device may also include opening an isolation switch between the first input terminal and the first signal conductor while electrically coupling the first and second signal conductors thereby isolating the first input terminal from the test switch.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein, rather, these embodiments are provided so that this disclosure will be thorough and complete, and will fully convey the scope of the invention to those skilled in the art. Like numbers refer to like elements throughout. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
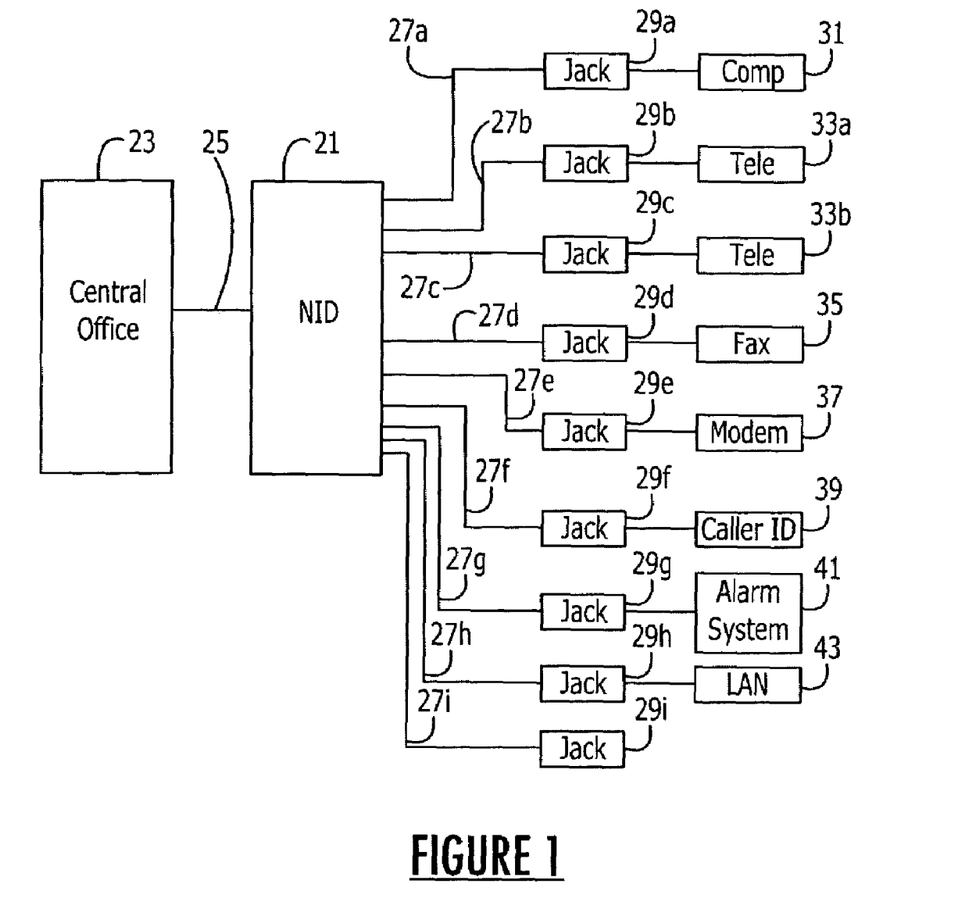
FIG. 1 is a block diagram of communications wiring according to embodiments of the present invention.

As illustrated in the block diagram of FIG. 1, communications for a residence may be provided according to embodiments of the present invention by a telephone service provider at a Network Interface Device (NID) 21 outside the residence. More particularly, the telephone service provider may provide service from a central office 23 to the NID 21 over an outside communications line 25 including a pair of conductors such as tip and ring conductors according to the RJ11 standard. Inside the residence, a plurality of inside communications lines 27*a-i* may provide coupling between respective telephone jacks 29*a-i* and the NID 21. Moreover, each telephone jack may provide a detachable coupling for a communications device, but a communications device does not have to be coupled to every jack. For example, one or more communications devices such as a computer 31, telephones 33*a-b*, a facsimile machine 35, a modem 37, a caller identification unit 39, an alarm system 41, and/or a local area network 43 may be coupled to one or more respective jacks 29*a-h*, and one or more jacks, such as jack 29*i*, may be left uncoupled to any communications device.

Residential communications can be provided according to the RJ11 standard wherein the outside communications line 25 includes a tip conductor and a ring conductor, and wherein each of the inside communications lines 27*a-i* includes respective tip and ring conductors coupled to the tip and ring conductors of the outside line through the NID 21. Moreover, the tip and ring conductor of each inside communication line 27*a-i* can be provided using a twisted pair of wires. Each of the jacks 29*a-i* can be provided using a faceplate assembly that can be mounted to a surface such as a wall within the residence. For example, a faceplate assembly may include input terminals configured to receive the tip and ring conductors of an inside communications line on a back surface thereof. A faceplate assembly may also include a communications port on a front surface thereof providing the detachable electrical coupling for a communications device. More particularly, the detachable electrical coupling may include output terminals electrically coupled with the input terminals of the faceplate assembly and providing detachable coupling according to the RJ11 standard. While embodiments of the present invention are discussed with respect to residential wiring, it will be understood that embodiments of the present invention may be implemented in non-residential communications wirings such as communications wirings for commercial, business, governmental, academic, and/or other organizational/business/personal communications operations.

Figure 2:
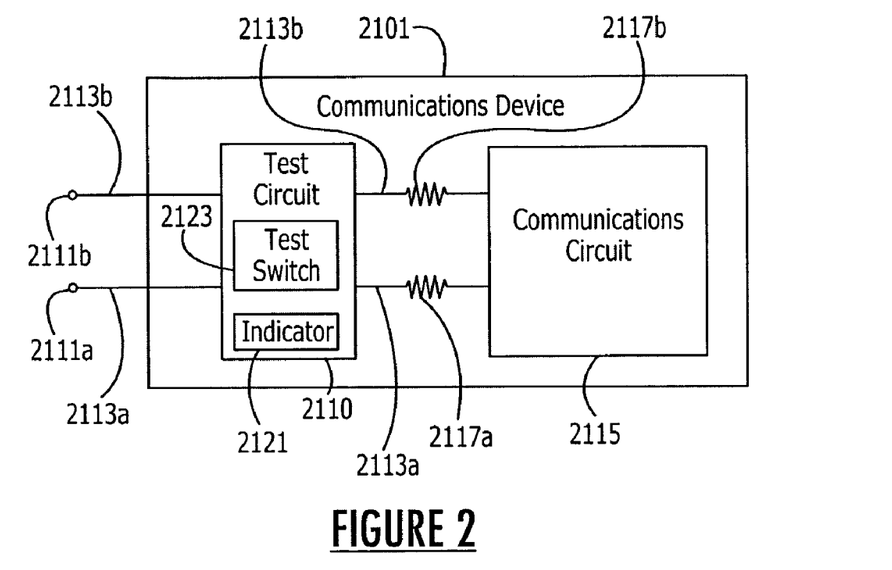
FIG. 2 is a diagram of a communications device including a test circuit according to embodiments of the present invention.

As illustrated in FIG. 2, a communications device 2101 according to embodiments of the present invention may include a test circuit 2110 used to detect a fault and/or short circuit within the communications device 2101 and/or in communications lines coupled with the communications device 2101 through input terminals 2111*a-b*. More particularly, the communications device 2101 may include signal conductors 2113*a-b*, such as tip and ring conductors, coupled between input terminals 2111*a-b* and communications circuit 2115 with the test circuit 2110 coupled along the signal conductors 2113*a-b* between the input terminals 2111*a-b* and the communications circuit 2115. The resistances 2117*a-b* may represent resistances of signal conductors 2113*a-b* of the communications device 2101. While the resistances 2117*a-b* are illustrated outside the test circuit 2110, the resistances 2117*a-b* could alternately be illustrated within the test circuit and/or between the test circuit and output terminals 2111*a-b*.

The communications circuit 2115 may provide a communications interface for operations such as audio telephone communications, facsimile communications, caller identification communications, computer communications, modem communications, alarm system communications, and/or local area network communications. For example, the communications device 2101 may be at least one of an audio telephone, a facsimile machine, a caller identification unit, a modem, an alarm system, and/or a local area network. In each of these examples, the communications circuit 2115 performs the communications operations of the communications device with the test circuit providing additional testing functionality. With an alarm system and/or local area network, for example, the communications circuit 2115 may provide a communications interface allowing the alarm system and/or local area network to communicate over a telephone communications line such as according to the RJ11 standard with the test circuit 2110 providing additional testing functionality. With a telephone, a facsimile machine, a caller identification unit, and/or a modem, for example, the communications circuit 2115 may provide the communications interface allowing telephone, facsimile, caller identification, and/or modem operations with the test circuit 2110 providing additional testing functionality.

The test circuit 2110 may include at least one indicator circuit 2121 and a test switch 2123 which may be normally open. The test switch may provide electrical coupling between the signal conductors 2113*a-b* of the communications device 2101 responsive to activation (closing) thereof. If an electrical circuit is completed through the test switch 2123 upon closing the test switch, the indicator circuit 2121 may provide indication thereof to indicate the presence of a fault and/or short circuit within the communications device 2101, between signal conductors 2113*a-b*, within communications circuit 2115, and/or within communications lines and/or devices coupled with the input terminals 2111a-b. With respect to communications lines and/or devices coupled with the input terminals 2111a-b, the test circuit 2110 may provide indication of faults and/or short circuits within a jack coupled to the input terminals 2111a-b, within a communications line coupled to the jack, and/or within other communications lines, jacks, and/or communications coupled to the residential wiring.

When testing the telephone communications device alone, the communications device can be decoupled from any communications jacks, lines, and/or devices, and the test switch 2123 can be activated. Upon activation of the test switch, a fault and/or short circuit within any jack, line, and or communications device coupled through input terminals 2111a-b may be indicated at the indicator circuit 2121. The communications device can be decoupled/isolated from other communication lines, devices, and jacks and retested to determine if the fault and/or short circuit is within the communications device or outside the communications device. If the fault and/or short circuit is indicated when the communications device is decoupled, the fault and/or short circuit is in the communications device which should not be reused until repaired.

Otherwise, the communications device can be coupled to the residential telephone jack, and the test repeated while successively removing components from the residential wiring. For example, the test can be repeated with the communications device coupled to the jack and a respective inside communication line that has been decoupled from the NID. If the test indicates a fault and/or short circuit, the inside communications line and jack can be maintained decoupled from the NID until the fault and/or short circuit is corrected. If the test is clear, the inside communications line can be recoupled to the NID, and all other communications devices can be decoupled from the residential wiring. If a fault and/or short circuit is indicated, the fault and/or short circuit can be isolated to one of the other inside communications lines or jacks. If no fault and/or short circuit is indicated, the test can be performed again as each of the other communications devices is recoupled to the residential wiring, and a single one of the other communications devices may be identified as the source of the fault and/or short circuit. Accordingly, the test circuit 2110 within communications device 2101 can be used to identify/isolate a fault and/or short circuit within the communications device, within a portion of a residential wiring, and/or within another communications device coupled to the residential wiring.

Moreover, the communications device 2101 can be isolated from a residential wiring by decoupling the input terminals 2111a-b from a detachable coupling with a telephone jack, such as a jack according to the RJ11 standard. In an alternative, the test circuit may include a normally closed isolation switch along one or both of the signal conductors 2113a-b between the respective input terminal 2111a-b and the test circuit 2110. Accordingly, the communications device can be isolated from the residential wiring for testing without unplugging the communications device from the residential wiring by pressing the isolation switch. The isolation switch can be left closed for tests including the residential wiring.

The indicator circuit 2121, for example, may include one or more light emitting elements such as light emitting diodes or conventional filament lights and/or an audible indicator. In addition, the indicator circuit may be defined to include an electrical power source such as a battery that can generate a current through the test switch 2123 and the indicator circuit 2121 when an electrical circuit is completed on activation of the test switch.

While test circuits according to embodiments of the present invention have been discussed as components of communications devices, test circuits according to alternate embodiments of the present invention may be used at locations within a residential wiring such as within a jack, within an NID, between an NID and an inside communications line, between an inside communications line and a jack. For example, one test circuit could be included at the NID of a residence for each inside communications line extending therefrom. Accordingly, an inside communications line and a communications device coupled thereto could be isolated and tested at the NID.

When operating in a normal communication mode, the test switch 2123 is not activated so that the first and second signal conductors 2113a-b are not coupled through the normally open test switch 2123. If an isolation switch is included in the test circuit 2110, the isolation switch is maintained in its normally closed position when operating in a normal communications mode. Accordingly, communications signals can be transmitted from input terminals 2111a-b over signal conductors 2113a-b to the communications circuit 2115.

According to embodiments of the present invention, the communications device 2101 can be unplugged from external communications wiring (such as unplugged from a communications port and/or jack) so that the input terminals 2111a-b are not coupled to external wiring. With the communications device 2101 unplugged, the test switch 2123 can be pressed by a customer/user/technician thereby coupling the signal conductors 2113a-b to test the isolated communications device 2101 for faults such as short circuits and/or grounds. If a fault such as a short circuit and/or ground is present within the communications device 2101 during the test, current through the indicator 2121 may provide indication thereof.

For example, the indicator circuit 2121 may include at least one LED and a battery in series with the test switch 2123 and the communications circuit 2115. As discussed above, the communications device can be isolated by unplugging the communications device from external wiring or by using an isolation switch along one or both of the signal conductors 2113a-b between the respective input terminal 2111a-b and the test circuit 2110. When testing the isolated communications device "on-hook", a fault such as a short circuit and/or ground may result in a current flow through the test switch, battery and LED indicator, so that a lit LED indicator indicates the presence of a fault such as a short circuit or ground in the communications device.

The test circuit 2110 can also be used to test for continuity (opens) within the isolated communications device by testing the communications device "off-hook". If the indicator does not provide indication of a closed circuit, there may be a continuity problem (an undesired open circuit) within the communications device. In the case of an indicator circuit 2121 including a battery and an LED, an unlit LED may indicate the presence of a continuity problem (undesired open) when testing "off-hook". When testing "off-hook" with an indicator circuit including a battery and at least one LED, a lit LED may indicate the absence of a continuity problem (open).

As discussed herein, the terms "on-hook" and "off-hook" refer to conventional telephone operations, wherein the communications circuit 2115 provides a relatively high resistance between the signal conductors 2113a-b when "on-hook" and wherein the communications circuit 2115 provides a relatively low resistance between the signal conductors 2113*a-b* when "off-hook". When providing telephone operations, the communications circuit 2115 is generally "on-hook" when the handset is resting in its cradle awaiting a call, and the communications circuit 2115 is generally "off-hook" when the handset is lifted from the cradle to receive or place a call. As will be understood, manual operation (such as lifting a handset) is not required to take a communications circuit "on-hook" and "off-hook". A modem, for example, may transition between "on-hook" and "off-hook" under electronic control. Moreover, a telephone including caller identification may transition from "on-hook" to "off-hook" to identify the caller before the handset is lifted to answer the call.

The indicator circuit 2110 of the communications device 2101 can also be used to test communications wiring and/or other communications devices by plugging the communications device 2101 including test circuit 2110 into a communications port so that the input terminals 2111*a-b* are coupled to the communications wiring. An entrance bridge network within the NID can be used to decouple all of the inside communications lines from the outside communications line to allow testing of inside wiring. For example, the communications device 2101 can be plugged into a jack to provide coupling with a first inside communications line, and others of the inside communications lines can be coupled to the first inside communications line through the entrance bridge network. By operating the test circuit 2110 while the communications device 2101 is coupled to the communications wiring, the communications wiring can be tested for faults and/or short circuits. Moreover, the first inside communications line coupled to the communications device can be tested separately by decoupling the first inside communications line from the other inside communications lines at the entrance bridge network. In addition, others of the communications lines can be tested by individually coupling others of the inside communications lines to the first inside communications line at the entrance bridge network.

In addition, other communications devices can be tested using the test circuit 2110 of communications device 2101 by coupling the two communications devices directly or through inside communications lines. Short circuits can be tested in one or both communications devices by keeping the communications devices "on-hook". Continuity may be tested by taking one or both communications devices "off-hook".

Figure 3:
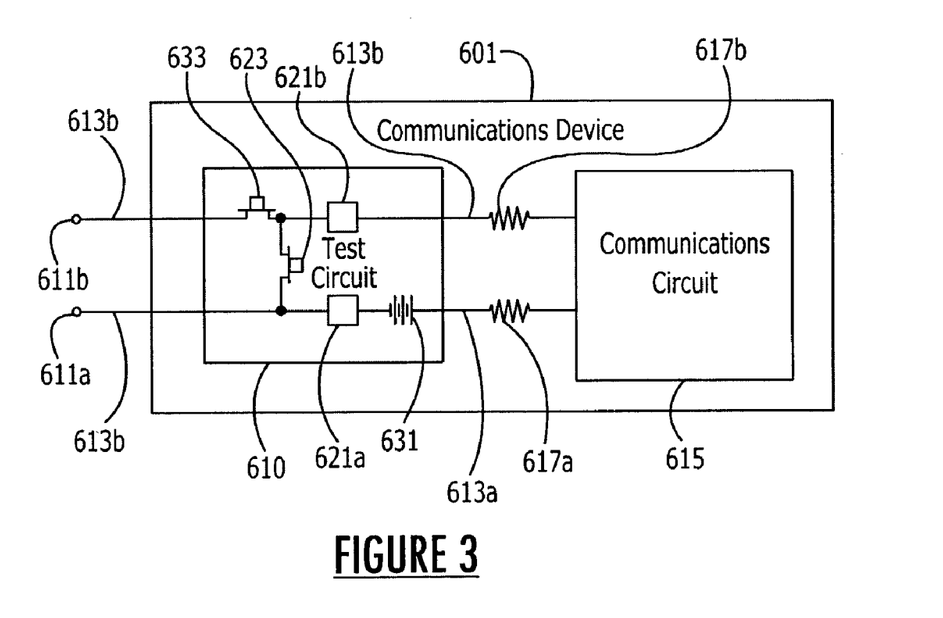
FIG. 3 is a diagram of a communications device including a test circuit according to additional embodiments of the present invention.

As illustrated in FIG. 3, a communication circuit 601 according to additional embodiments of the present invention may include a test circuit 610 used to detect a fault and/or short circuit within the communications device and/or in communications lines coupled with the communications device through input terminals 611*a-b*. More particularly, the communications device may include signal conductors 613*a-b*, such as tip and ring conductors, coupled between input terminals 611*a-b* and communications interface 615 with the test circuit 610 coupled along the signal conductors 613*a-b* between the input terminals 611*a-b* and the communications circuit 615. The resistances 617*a-b* represent resistances of signal conductors 613*a-b* of the communications device. While the resistances 617*a-b* are illustrated outside the test circuit 610, the resistances 617*a-b* could alternately be illustrated within the test circuit and/or between the test circuit and output terminals 611*a-b*.

The communications circuit 615 may provide a communications interface for operations such as audio telephone communications, facsimile communications, caller identification communications, computer communications, modem communications, alarm system communications, and/or local area network communications. For example, the communications device 601 may be at least one of an audio telephone, a facsimile machine, a caller identification unit, a modem, an alarm system, and/or a local area network. In each of these examples, the communications circuit 615 performs the communications operations of the communications device 601 with the test circuit 610 providing additional testing functionality. With an alarm system and/or local area network, for example, the communications circuit 615 may provide a communications interface allowing the alarm system and/or local area network to communicate over a telephone communications line such as according to the RJ11 standard with the test circuit 610 providing additional testing functionality. With a telephone, a facsimile machine, a caller identification unit, and/or a modem, for example, the communications circuit 615 may provide the communications interface allowing telephone, facsimile, caller identification, and/or modem operations with the test circuit 610 providing additional testing functionality.

The test circuit 610 may include indicator circuits 621*a-b*, a battery 631, and a test switch 623 which may be normally open. As shown, the normally open test switch 623 may be included on a bridge between the signal conductors 613*a-b*, and each of the indicator circuits 621*a-b* may be coupled along a respective signal conductor 613*a-b* between the test switch 623 and the communications circuit 615. While two indicator circuits are illustrated, a single indicator circuit or more indicator circuits could be used according to embodiments of the present invention. For example, indicator circuits may be provided along the bridge between signal conductors 613*a-b* in series with the test switch 623, and/or indicator circuits may be provided on the signal conductors between the input terminals 611*a-b* and the test switch 623. Moreover, the battery 631 may be included along one of the signal conductors as illustrated. In an alternative, the battery may be provided along the bridge between signal conductors 613*a-b* in series with the test switch 623.

The test switch 623 may provide electrical coupling between the signal conductors 613*a-b* of the communications device 601 responsive to activation (closing) thereof. If an electrical circuit is completed through the test switch 623, the battery 631, and either of the indicator circuits 621*a-b* upon closing the test switch, the respective indicator circuit(s) 621*a* and/or 621*b* may provide indication thereof to indicate the presence of a short circuit and/or fault within the communications device 601, between signal conductors 613*a-b*, within communications circuit 615, and/or within communications lines and/or devices coupled with the input terminals 611*a-b*. With respect to communications lines and/or devices coupled with the input terminals 611*a-b*, the test circuit 610 may provide indication of faults and/or short circuits within a jack coupled to the input terminals 611*a-b*, within a communications line coupled to the jack, and/or within other communications lines, jacks, and/or communications devices coupled to the residential wiring.

When testing the telephone communications device alone, the communications device can be decoupled from any communications jacks, lines, and/or devices, and the test switch 623 can be activated. When testing communications jacks, lines, and/or devices coupled through input terminals 2111*a-b*, a fault and/or short circuit within any jack, line, and or communications device coupled through input terminals 611*a-b* may be indicated at one or both of the indicator circuits 621*a-b*. The communications device can be decoupled/isolated from other communication lines, devices, and jacks and retested to determine if the short circuit and/or fault is within the communications device or outside the communications device. If the fault and/or short circuit is indicated when the communications device is decoupled, the short circuit and/or fault is in the communications device which should not be reused until repaired.

Otherwise, the communications device can be coupled to the residential telephone jack, and tests repeated while successively removing components from the residential wiring. For example, tests can be repeated with the communications device coupled to the jack and a respective inside communication line that has been decoupled from the NID. If the test indicates a fault and/or short circuit, the inside communications line and jack can be maintained decoupled from the NID until the fault and/or short circuit is corrected. If the test is clear, the inside communications line can be recoupled to the NID, and all other communications devices can be decoupled from the residential wiring. If a fault and/or short circuit is indicated, the fault and/or short circuit can be isolated to one of the other inside communications lines or jacks. If no fault and/or short circuit is indicated, tests can be performed again as each of the other communications devices is recoupled to the residential wiring, and a single one of the other communications devices may be identified as the source of the fault and/or short circuit. Accordingly, the test circuit 610 within communications device 601 can be used to identify/isolate a short circuit and/or fault within the communications device 601, within a portion of a residential wiring, and/or within another communications device coupled to the residential wiring.

Moreover, the communications device 601 can be isolated from a residential wiring by decoupling the input terminals 611a-b from a detachable coupling with a telephone jack, such as a jack according to the RJ11 standard. In an alternative, the test circuit may include a normally closed isolation switch 633 along one of the signal conductors 613a-b between the respective input terminal 611a-b and the test switch 623. Accordingly, the communications device 601 can be isolated from the residential wiring for testing without unplugging the communications device from the residential wiring by pressing the isolation switch 633. The isolation switch 633 can be left closed for tests including the residential wiring.

The test switch 623 and the isolation switch 633 may be separately operable, or the test and isolation switches may be operable using the same mechanism. With manually operable switches, the normally open test switch 623 can be closed and the normally closed isolation switch 633 can be opened upon actuation of a single button, switch, or other mechanism. In an alternative, the test switch 623 and the isolation switch 633 can be actuated using separate buttons, switches, or other mechanisms. Moreover, the isolation switch 633 and the test switch 623 may be separately or commonly operable using mechanical actuation such as a button, switch, or other mechanical mechanism, or the isolation switch 633 and test switch 623 may be operable by other mechanisms such as electrically operable switches. For example, one or both of the test and isolation switches may be transistors that close/open responsive to electrical signals applied thereto.

Figure 4:
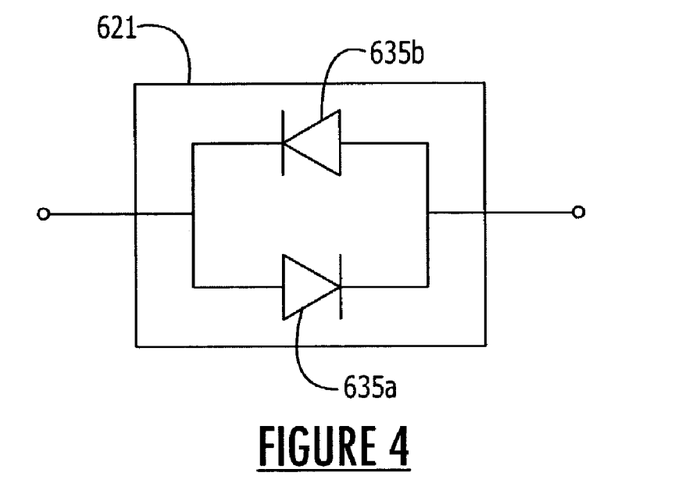
FIG. 4 is a diagram of an indicator circuit according to embodiments of the present invention.

Each of the indicator circuits 621a-b, for example, may include one or more light emitting elements such as light emitting diodes or conventional filament lights and/or an audible indicator. In an alternative, each indicator circuit 621 may include two parallel connected light emitting diodes (LEDs) 635a-b connected in opposite directions thereby facilitating current flow in both directions as illustrated in FIG. 4.

While test circuits according to embodiments of the present invention have been discussed as components of communications devices, test circuits according to alternate embodiments of the present invention may be used at locations within a residential wiring such as within a jack, within an NID, between an NID and an inside communications line, between an inside communications line and a jack. For example, one test circuit could be included at the NID of a residence for each inside communications line extending therefrom. Accordingly, an inside communications line and a communications device coupled thereto could be isolated and tested at the NID.

When operating in a normal communication mode, the test switch 623 is not activated so that the first and second signal conductors 613a-b are not coupled through the normally open test switch 623. If an isolation switch 633 is included in the test circuit 610, the isolation switch 633 is maintained in its normally closed position when operating in a normal communications mode. Accordingly, communications signals can be transmitted from input terminals 611a-b over signal conductors 613a-b to the communications circuit 615.

According to embodiments of the present invention illustrated in FIG. 3, the communications device 601 can be unplugged from external communications wiring (such as unplugged from a communications port and/or jack) so that the input terminals 611a-b are not coupled to external wiring. With the communications device unplugged, the test switch 623 can be pressed by a customer/user/technician thereby coupling the signal conductors 613a-b to test the isolated communications device for faults such as short circuits and/or grounds. If a fault such as a short circuit and/or ground is present within the communications device during the test, current through one or both of the indicators 621a-b, the battery 631, and the test switch 623 may provide indication thereof.

For example, each indicator circuit 621a-b may include at least one LED in series with the communications circuit 615, the test switch 623, and the battery 631. As discussed above, the communications device can be isolated by unplugging the communications device from external wiring or by using isolation switch 633. When testing with the isolated communications circuit 615 "on-hook", a fault such as a short circuit and/or ground may result in a current flow through the test switch, battery and indicators 621a-b, so that a lit indicator indicates the presence of a fault such as a short circuit or ground in the communications device (when the indicators each comprise at least one LED).

The test circuit can also be used to test for continuity (opens) within the communications device by testing with the communications circuit 615 "off-hook". If the indicator does not provide indication of a closed circuit, there may be a continuity problem (an undesired open circuit) within the communications device. In the case of an indicator circuit including an LED, an unlit LED may indicate the presence of a continuity problem (undesired open) when testing "off-hook". When testing "off-hook" with an indicator circuit including at least one LED, a lit LED may indicate the absence of a continuity (open) problem (when the indicators each comprise at least one LED).

The test circuit 610 of the communications device 601 can also be used to test communications wiring and/or other communications devices by plugging the communications device into a communications port so that the input terminals 611a-b are coupled to the communications wiring. An entrance bridge network within the NID can be used to decouple all of the inside communications lines from the outside communications line to allow testing of inside wiring. For example, the communications device 601 can be plugged into a jack to provide coupling with a first inside communications line, and others of the inside communications lines can be coupled to the first inside communications line through the entrance bridge network. By maintaining the test switch 623 opened and placing the communications circuit "off-hook" while the communications device 601 is coupled to the communications wiring, the communications wiring can be tested for faults and/or short circuits.

More particularly, a short circuit in wiring coupled to the input terminals 611a-b while the test switch 623 is open and the communications circuit 615 is "off-hook" should result in lighting one or both of the indicator circuits 621a-b (where the indicator circuits each comprise one or more LEDs). Moreover, the first inside communications line coupled to the communications device can be tested separately by decoupling the first inside communications line from the other inside communications lines at the entrance bridge network. In addition, others of the communications lines can be tested by individually coupling others of the inside communications lines to the first inside communications line at the entrance bridge network.

In addition, other communications devices can be tested using the test circuit 610 of communications device 601 by coupling the two communications devices directly or through inside communications lines. Short circuits in the communications device not including a test circuit can be tested by keeping the other communications devices "on-hook" and taking communications circuit 615 "off-hook". A short circuit and/or ground in the other communications device may result in a lighting of one or both indicator circuits (when the indicator circuits comprise LEDs). Continuity may be tested by taking both communications devices "off-hook" and maintaining the test switch 623 open. If either indicator does not light (where each indicator comprises at least one LED), there may be a continuity problem in one of the communications devices.

Figure 5:
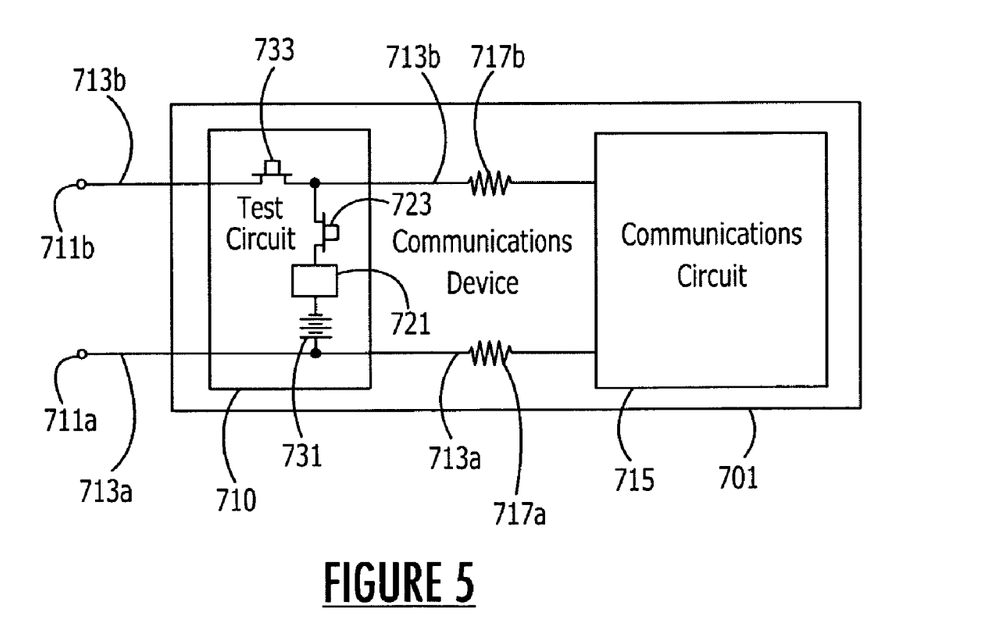
FIG. 5 is a diagram of a communications device including a test circuit according to yet additional embodiments of the present invention.

As illustrated in FIG. 5, a communication circuit 701 according to additional embodiments of the present invention may include a test circuit 710 used to detect a fault and/or short circuit within the communications device and/or in communications lines coupled with the communications device through input terminals 711a-b. More particularly, the communications device may include signal conductors 713a-b, such as tip and ring conductors, coupled between input terminals 711a-b and communications circuit 715 with the test circuit 710 coupled along the signal conductors 713a-b between the input terminals 711a-b and the communications circuit 715. The resistances 717a-b represent resistances of signal conductors 713a-b of the communications device. While the resistances 717a-b are illustrated outside the test circuit 710, the resistances 717a-b could alternately be illustrated within the test circuit 710 and/or between the test circuit and input terminals 711a-b.

The communications circuit 715 may provide a communications interface for operations such as audio telephone communications, facsimile communications, caller identification communications, computer communications, modem communications, alarm system communications, and/or local area network communications. For example, the communications device 701 may be at least one of an audio telephone, a facsimile machine, a caller identification unit, a modem, an alarm system, and/or a local area network. In each of these examples, the communications circuit 715 performs the communications operations of the communications device with the test circuit providing additional testing functionality. With an alarm system and/or local area network, for example, the communications circuit 715 may provide a communications interface allowing the alarm system and/or local area network to communicate over a telephone communications line such as according to the RJ11 standard with the test circuit 710 providing additional testing functionality. With a telephone, a facsimile machine, a caller identification unit, and/or a modem, for example, the communications circuit 715 may provide the communications interface allowing telephone, facsimile, caller identification, and/or modem operations with the test circuit 710 providing additional testing functionality.

The test circuit 710 may include an indicator circuit 721, a battery 731, and a test switch 723 which may be normally open. As shown, the normally open test switch 723 may be included on a bridge between the signal conductors 713a-b, and the indicator circuit 721 may be coupled along the bridge in series with the test switch 723 and the battery 731. While one indicator circuit is illustrated in FIG. 5, two or more indicator circuit may be provided in the communications device 701. For example, additional indicator circuits may be provided along the bridge in series with the test switch 723 between the signal conductors 713a-b and/or additional indicator circuits may be provided along signal conductors 713a and/or 713b between the test switch and the input terminals 711a-b and/or between the test switch and the communications circuit 715.

Moreover, the battery 731 may be provided along the bridge between signal conductors 713a-b in series with the test switch 723. In an alternative, the battery 731 may be included along one of the signal conductors. By providing the battery 731 in series with the test switch between the signal conductors 713a-b, drain of the battery 731 may be reduced when the test switch 723 is not closed, and the battery 731 may be removed from the communications signal path.

The test switch 723 may provide electrical coupling between the signal conductors 713a-b of the communications device 701 responsive to activation (closing) thereof. If an electrical circuit is completed through the test switch 723, the battery 731, and the indicator circuit 721a-b upon closing the test switch 723, the indicator circuit 721 may provide indication thereof to indicate the presence of a short circuit and/or fault within the communications device 701, between signal conductors 713a-b, within communications circuit 715, and/or within communications lines and/or devices coupled with the input terminals 711a-b. With respect to communications lines and/or devices coupled with the input terminals 711a-b, the test circuit 710 may provide indication of faults and/or short circuits within a jack coupled to the input terminals 711a-b, within a communications line coupled to the jack, and/or within other communications lines, jacks, and/or communications devices coupled to the residential wiring.

When testing the telephone communications device alone, the communications device can be decoupled from any communications jacks, lines, and/or devices, and the test switch 723 can be activated. Upon activation of the test switch 723, a short circuit and/or fault within any jack, line, and or communications device coupled through input terminals 711a-b may be indicated at the indicator circuit 721. The communications device can be decoupled/isolated from other communication lines, devices, and jacks and retested to determine if the short circuit and/or fault is within the communications device or outside the communications device. If the fault and/or short circuit is indicated when the communications device is decoupled, the short circuit and/or fault is in the communications device which should not be reused until repaired.

Otherwise, the communications device can be coupled to the residential telephone jack, and the test repeated while successively removing components from the residential wiring. For example, the test can be repeated with the communications device coupled to the jack and a respective inside communication line that has been decoupled from the NID. If the test indicates a short circuit and/or fault, the inside communications line and jack can be maintained decoupled from the NID until the fault and/or short circuit is corrected. If the test is clear, the inside communications line can be recoupled to the NID, and all other communications devices can be decoupled from the residential wiring. If a fault and/or short circuit is indicated, the fault and/or short circuit can be isolated to one of the other inside communications lines or jacks. If no fault and/or short circuit is indicated, the test can be performed again as each of the other communications devices is recoupled to the residential wiring, and a single one of the other communications devices may be identified as the source of the fault and/or short circuit. Accordingly, the test circuit 710 within communications device 701 can be used to identify/isolate a short circuit and/or fault within the communications device, within a portion of a residential wiring, and/or within another communications device coupled to the residential wiring.

Moreover, the communications device can be isolated from a residential wiring by decoupling the input terminals 711a-b from a detachable coupling with a telephone jack, such as a jack according to the RJ11 standard. In an alternative, the test circuit may include a normally closed isolation switch 733 along one of the signal conductors 713a-b between the respective input terminal 711a-b and the test switch 723. Accordingly, the communications device can be isolated from the residential wiring for testing without unplugging the communications device from the residential wiring by pressing the isolation switch 733. The isolation switch 733 can be left closed for tests including the residential wiring.

The test switch 723 and the isolation switch 733 may be separately operable, or the test and isolation switches may be operable using the same mechanism. With manually operable switches, the normally open test switch 723 can be closed and the normally closed isolation switch 733 can be opened upon actuation of a single button, switch, or other mechanism. In an alternative, the test switch 723 and the isolation switch 733 can be actuated using separate buttons, switches, or other mechanisms. Moreover, the isolation switch 733 and the test switch 723 may be separately or commonly operable using mechanical actuation such as a button, switch, or other mechanical mechanism, or the isolation switch 733 and test switch 723 may be operable by other mechanisms such as electrically operable switches. For example, one or both of the test and isolation switches may be transistors that close/open responsive to electrical signals applied thereto.

The indicator circuit 721, for example, may include one or more light emitting elements such as light emitting diodes or conventional filament lights and/or an audible indicator. In an alternative, the indicator circuit 721 may include two parallel connected light emitting diodes (LEDs) connected in opposite directions thereby facilitating current flow in both directions as illustrated, for example, in FIG. 4.

While test circuits according to embodiments of the present invention have been discussed as components of communications devices, test circuits according to alternate embodiments of the present invention may be used at locations within a residential wiring such as within a jack, within an NID, between an NID and an inside communications line, between an inside communications line and a jack. For example, one test circuit could be included at the NID of a residence for each inside communications line extending therefrom. Accordingly, an inside communications line and a communications device coupled thereto could be isolated and tested at the NID.

When operating in a normal communication mode, the test switch 723 is not activated so that the first and second signal conductors 713a-b are not coupled through the normally open test switch 723. If an isolation switch 733 is included in the test circuit 710, the isolation switch is maintained in its normally closed position when operating in a normal communications mode. Accordingly, communications signals can be transmitted from input terminals 711a-b over signal conductors 713a-b to the communications circuit 715.

According to embodiments of the present invention illustrated in FIG. 5, the communications device 701 can be unplugged from external communications wiring (such as unplugged from a communications port and/or jack) so that the input terminals 711a-b are not coupled to external wiring. With the communications device unplugged, the test switch 723 can be pressed by a customer/user/technician thereby coupling the signal conductors 713a-b to test the isolated communications device for faults such as short circuits and/or grounds. If a fault such as a short circuit and/or ground is present within the communications device during the test, current through one or both of the indicators 721a-b, the battery 731, and the test switch 723 may provide indication thereof.

For example, each indicator circuit 721a-b may include at least one LED in series with the communications circuit 715, the test switch 723, and the battery 731. As discussed above, the communications device can be isolated by unplugging the communications device from external wiring or by using isolation switch 733. When testing the isolated communications circuit "on-hook", a fault such as a short circuit and/or ground may result in a current flow through the test switch 723, battery 731, and indicator 721, so that a lit indicator indicates the presence of a fault such as a short circuit or ground in the communications device.

The test circuit can also be used to test for continuity (opens) within the communications device by testing with the communications circuit 715 "off-hook". If the indicator does not provide indication of a closed circuit upon activating the test switch, there may be a continuity problem (an undesired open circuit) within the communications device. In the case of an indicator circuit including an LED, an unlit LED may indicate the presence of a continuity problem (undesired open) when testing "off-hook". When testing "off-hook" with an indicator circuit including at least one LED, a lit LED may indicate the absence of a continuity problem (open).

The test circuit 710 of the communications device 701 can also be used to test communications wiring and/or other communications devices by plugging the communications device into a communications port so that the input terminals 711a-b are coupled to the communications wiring. An entrance bridge network within the NID can be used to decouple all of the inside communications lines from the outside communications line to allow testing of inside wiring. For example, the communications device 701 can be plugged into a jack to provide coupling with a first inside communications line, and others of the inside communications lines can be coupled to the first inside communications line through the entrance bridge network. By closing the test switch 723 and placing the communications circuit "on-hook" while the communications device 701 is coupled to the communications wiring, the communications wiring can be tested for faults and/or short circuits.

More particularly, a short circuit in wiring coupled to the input terminals 711*a-b* while the test switch 23 is closed, while the communications circuit 715 is "on-hook", and while the coupled wiring is isolated from outside communications lines, should result in lighting the indicator circuit 721 (when the indicator circuit comprises one or more LEDs). Moreover, the first inside communications line coupled to the communications device can be tested separately by decoupling the first inside communications line from outside communications lines and from other inside communications lines at the entrance bridge network. In addition, others of the communications lines can be tested by individually coupling others of the inside communications lines to the first inside communications line at the entrance bridge network.

In addition, other communications devices can be tested using the test circuit 710 of communications device 701 by coupling the two communications devices directly or through inside communications lines. Short circuits in the communications device not including a test circuit can be tested by keeping the other communications devices and the communications circuit 715 "on-hook". A short circuit and/or ground in either communications device may result in a lighting of the indicator circuit 721 when the indicator circuit comprises one or more LEDs. Continuity may be tested by taking the other communications device "off-hook", maintaining the communications circuit 715 "on-hook", and closing the test switch 723. If the indicator 721 does not light (where the indicator comprises at least one LED), there may be a continuity problem in the other communications device.

Figure 6:
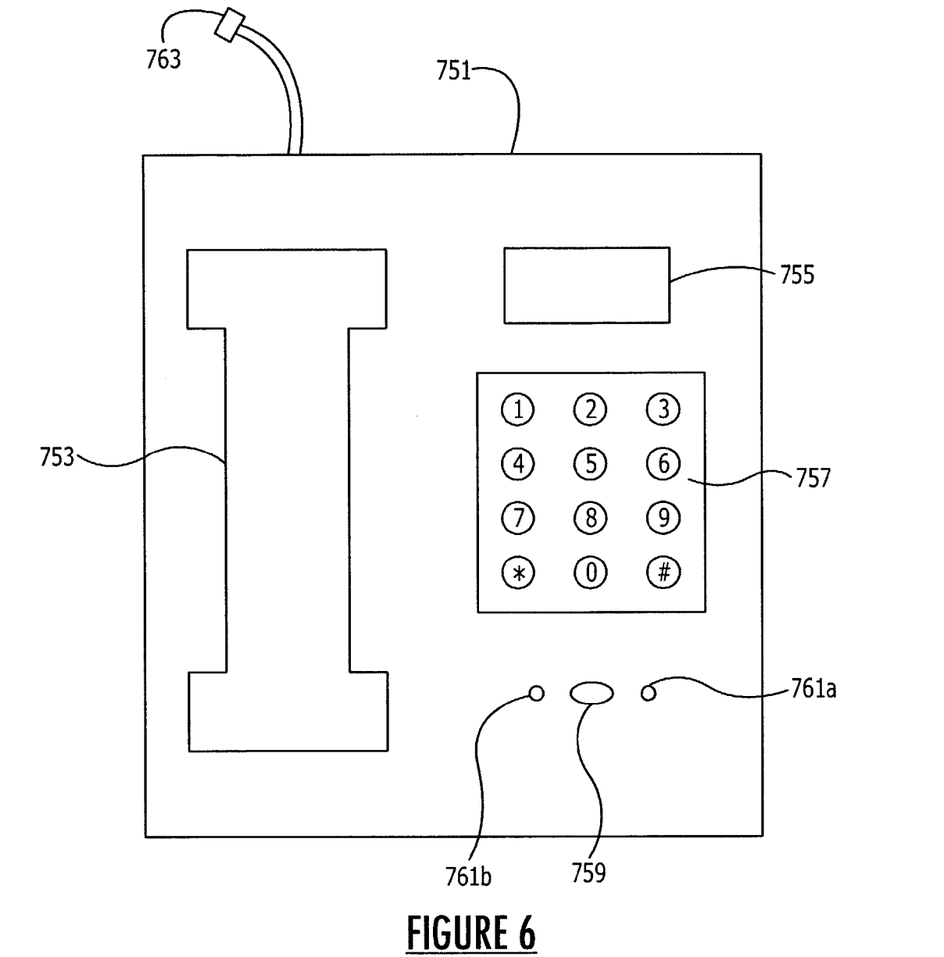
FIG. 6 is a view of a communications device according to embodiments of the present invention.

As shown in FIG. 6, a communications device 751 according to embodiments of the present invention may be implemented as a telephone including a handset 753, a display 755, a keypad 757, a test switch actuator 759, and indicators 761*a-b*. The communications device can also include a detachable coupling 763, such as a plug for an RJ11 coupling. The communications device 751 includes a test circuit according to embodiments of the present inventions such as illustrated in FIGS. 2-5. The test switch actuator 759 may comprise a button that closes the normally open test switch upon pressing thereof thereby activating the test circuit. If the test circuit is activated by pressing the test switch actuator, one or more of the indicators 761*a-b* may provide indication if a short circuit and/or fault is present within the communications device and/or within communications lines and/or other communications devices coupled thereto. For example, if an LED or other light emitting element is used as the indicator circuit, a light emitting portion of the indictor circuit may provide the indicators, and a light indicator may provide indication of a fault and/or short circuit.

As shown if FIG. 6, two indicators may be included in the communications device, but one or more than two indicators may be provided according to the number of indicator circuits in the test circuit and a number of indicating elements within each test circuit. Moreover, if one or more indicator circuits are provided along signal conductors of the communications device as illustrated, for example, in FIG. 3, the indicators may also provide indication when the communication device is in use. If an isolation switch is included in the test circuit as shown in FIGS. 3 and 5, the communications device 751 may also include an isolation switch actuator that opens the normally closed isolation switch on pressing thereof. Accordingly, the communications device can be isolated from outside communications lines for isolated testing without unplugging the communications device from a jack. In an alternative, the communications device can be isolated from outside communications lines by unplugging the communications device and then pressing the test switch actuator.

In addition, testing may be performed by pressing the test switch while the telephone is "on-hook" and not in use for communications but still coupled to an outside communications line. In an alternative, testing may be performed by pressing the test switch while the telephone is isolated from outside communications lines and "off-hook". In another alternative, testing may be performed by pressing the test switch while the telephone is "on-hook" and not coupled to an outside communications line. The different tests can be used to test for different faults and/or short circuits in the communications device and in communications lines outside the communications device and coupled thereto.

Figure 7:
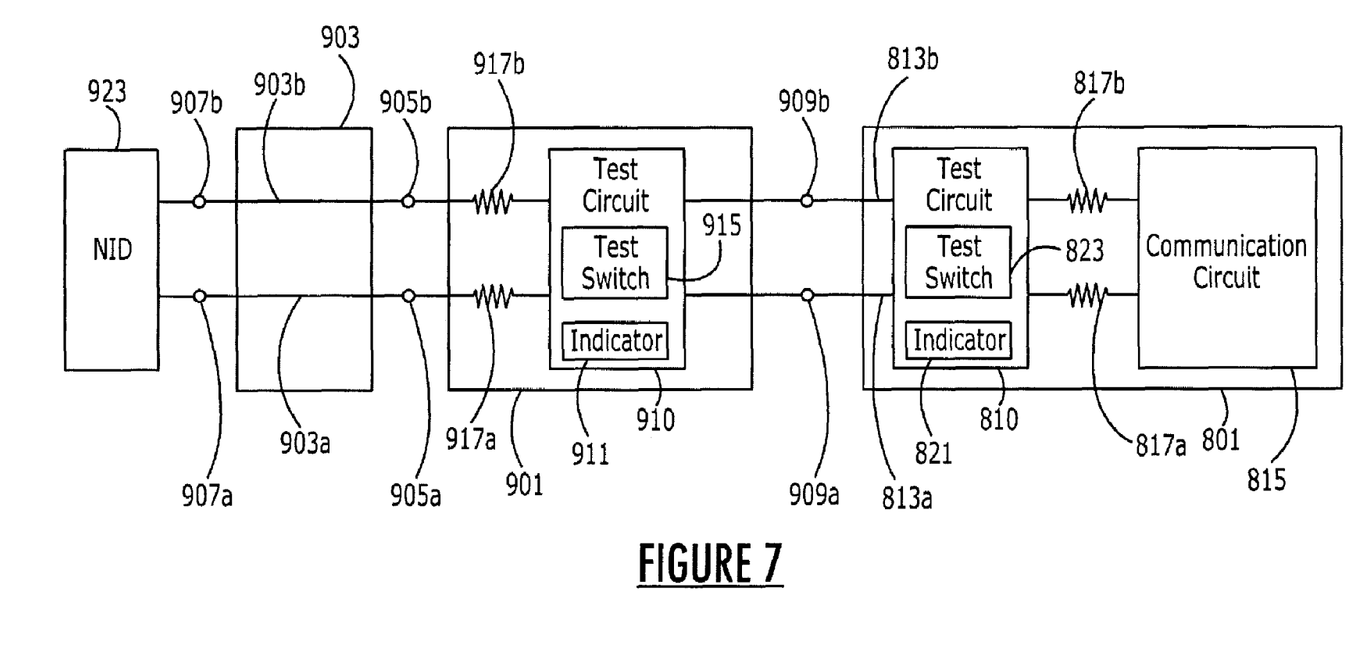
FIG. 7 is a diagram of a communications device coupled to communications wiring according to embodiments of the present invention.

As shown in FIG. 7, a communications device 801 including a test circuit 810 according to embodiments of the present invention may be used in combination with a communications jack 901 including a test circuit 910. The test circuit 810 can be implemented, for example, using test circuit 2110 of FIG. 2, test circuit 610 of FIG. 3, or test circuit 710 of FIG. 5. Moreover, the signal conductors 813*a-b*, the test switch 823, the indicator circuit 821, the communications circuit 815, and the line resistances 817*a-b* may also be implemented, for example, as discussed above with respect to FIGS. 2-5. The use of test circuits in communications jacks is discussed in application Ser. No. 10/419,415 entitled "Communications Jacks Including Test Circuits And Related Circuits And Methods", the disclosure of which is hereby incorporated herein in its entirety by reference. The test circuit 910, the test switch 915, the indicator circuit 911, the line resistances 917*a-b*, the inside communication line conductors 903*a-b*, the NID output terminals 907*a-b*, the jack 901, the inside communications line 903, and the NID 923 can be implemented, for example, using any of the test circuits, jacks, inside communications lines, and NIDs discussed in application Ser. No. 10/419,415 entitled "Communications Jacks Including Test Circuits And Related Circuits And Methods".

The communications device 801 and the jack 901 can be detachably coupled using a communications port 909*a-b* such as provided according to the RJ11 standard. According to embodiments of the present invention, a short circuit and/or fault within any of the elements illustrated in FIG. 7 may be identified and/or isolated using either test circuit 910 and/or 810. For example, if test circuits 810 and 910 include test switches on bridges between respective signal conductors of communications device 801 and jack 901, either test circuit could detect a fault and/or short circuit within communications device 801, jack 901, inside communications line 903, NID 923, and/or other communications lines, jacks, and/or communications devices coupled through NID 923. According to embodiments of the present invention, respective test circuits may be included in both communications device 801 and jack 901, in one or the other of communications device 801 and jack 901.

In addition or in an alternative, test circuits according to embodiments of the present invention can be included at the NID 923 for each inside communications line coupled to the NID. For example, a normally open test switch may be provided at the NID for each communications line on a bridge between signal conductors for the communications line. In addition, a normally closed isolation switch may be provided at the NID for each communications line in series with one of the signal conductors for the communications line and between the test switch for the communications line and a coupling with other communications lines and/or the outside communications line. In addition, one or more indicator circuits and a battery may be included on the bridge in series with the test switch and/or along one of the signal conductors for the communications line between the test switch and the communications line.

Stated in other words, any of test circuits 2110, 610, and/or 710 may be included at the NID 923 for each of a plurality of inside communications lines coupled to the NID. For a given communications line, the communications line can be isolated from other communications lines at the NID by activating the isolation switch, and testing for faults and/or short circuits along the communications line and any jacks and/or communications devices coupled to the communications can be performed by activating the test switch. The respective indicator circuit, such as an LED, may provide indication of the presence of a short circuit and/or fault along the communications line and any jack and/or communications device coupled to the communications line.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A communications device comprising:
    first and second input terminals configured to provide coupling with respective first and second conductors of a communications line;
    first and second signal conductors respectively coupled with the first and second input terminals;
    a communications circuit coupled to the first and second signal conductors wherein the communications circuit provides a communications interface;
    a test switch configured to electrically couple the first and second signal conductors responsive to activation thereof; and
    an indicator circuit configured to provide indication of a completed electrical circuit through the test switch wherein the indicator circuit comprises a battery and at least one light emitting diode electrically coupled in series with the test switch and the communications circuit.

2. A communications device according to claim 1 wherein the indicator circuit is configured to provide indication of a completed electrical circuit through the test switch while the communications circuit is maintained on-hook.

3. A communications device according to claim 1 wherein the test switch is configured to be manually activated.

4. A communications device according to claim 1 wherein the test switch, the battery, and the at least one light emitting diode are provided on a bridge between the first and second signal conductors so that electrical couplings between the first and second input terminals and the communications circuit through the first and second signal conductors are free of the test switch, the battery, and the at least one light emitting diode.

5. A communications device according to claim 1 wherein the at least one diode is visible from a surface of the communications device.

6. A communications device according to claim 1 wherein the at least one light emitting diode comprises two parallel connected light emitting diodes connected in opposing directions.

7. A communications device according to claim 1 wherein the at least one light emitting diode comprises at least a first light emitting diode connected along the first signal conductor in series between the first input terminal and the communications circuit.

8. A communications device according to claim 7 wherein the at least one light emitting diode comprises at least a second light emitting diode connected along the second signal conductor in series between the second input terminal and the communications circuit.

9. A communications device according to claim 1 wherein the first and second input terminals are configured to be coupled to a communications port.

10. A communications device according to claim 1 wherein the first and second input terminals are configured to be coupled to a communications port according to the RJ11 standard.

11. A communications device according to claim 1 wherein the first and second input terminals are configured to provide a detachable electrical coupling with respective first and second conductors of a communications port.

12. A communications device according to claim 1 wherein the communications circuit provides a communications interface for at least one of audio telephone communications, facsimile communications, caller identification communications, computer communications, modem communications, alarm system communications, and/or local area network communications.

13. A communications device according to claim 1 further comprising:
    an isolation switch on the first signal conductor coupled in series between the first input terminal and the test switch wherein the isolation switch is normally closed and wherein the isolation switch is opened responsive to activation thereof.

14. A test circuit for a communications device including first and second signal conductors coupled between first and second input terminals and a communications circuit providing a communications interface, the test circuit comprising:
    a test switch configured to electrically couple the first and second signal conductors responsive to activation thereof; and
    an indicator circuit configured to provide indication of a completed electrical circuit through the test switch wherein the indicator circuit comprises a battery and at least one light emitting diode electrically coupled in series with the test switch and the communications circuit.

15. A test circuit according to claim 14 wherein the indicator circuit is configured to provide indication of a completed electrical circuit through the test switch while the communications circuit is maintained on-hook.

16. A test circuit according to claim 14 wherein the test switch is configured to be manually activated.

17. A test circuit according to claim 14 wherein the test switch, the battery, and the at least one light emitting diode are provided on a bridge between the first and second signal conductors so that electrical couplings between the first and second input terminals and the communications circuit through the first and second signal conductors are free of the test switch, the battery, and the at least one light emitting diode.

18. A test circuit according to claim 14 wherein the at least one diode is visible from a surface of the communications device.

19. A test circuit according to claim 14 wherein the at least one light emitting diode comprises two parallel connected light emitting diodes connected in opposing directions.

20. A test circuit according to claim 14 wherein the at least one light emitting diode comprises at least a first light emitting diode connected along the first signal conductor in series between the first input terminal and the communications circuit.

21. A test circuit according to claim 20 wherein the at least one light emitting diode comprises at least a second light emitting diode connected along the second signal conductor in series between the second input terminal and the communications circuit.

22. A test circuit according to claim 14 wherein the first and second signal input terminals are configured to be coupled to a communications port.

23. A test circuit according to claim 14 wherein the first and second input terminals are configured to be coupled to a communications port according to the RJ11 standard.

24. A test circuit according to claim 14 wherein the first and second input terminals are configured to provide a detachable electrical coupling with respective first and second conductors of a communications port.

25. A test circuit according to claim 14 wherein the communications circuit provides a communications interface for at least one of audio telephone communications, facsimile communications, caller identification communications, computer communications, modem communications, alarm system communications, and/or local area network communications.

26. A test circuit according to claim 14 further comprising:
an isolation switch on the first signal conductor between the test switch and the first input terminal wherein the isolation switch is normally closed and wherein the isolation switch is opened responsive to activation thereof.

27. A method of testing a communications device including first and second signal conductors coupled between first and second input terminals and a communications circuit provide a communications interface, the method comprising:
electrically coupling the first and second signal conductors of the communications device through a test switch; and
providing indication of a completed electrical circuit through the test switch;
wherein electrically coupling the first and second signal conductors comprises electrically coupling a series connection of a battery and at least one light emitting diode through the test switch.

28. A method according to claim 27 wherein providing indication of a completed electrical circuit comprises provide indication of a completed electrical circuit through the test switch while the communications circuit is maintained on-hook.

29. A method according to claim 27 wherein electrically coupling the first and second signal conductors comprises manually activating the test switch.

30. A method according to claim 27 wherein the test switch, the battery, and the at least one light emitting diode are provided on a bridge between the first and second signal conductors so that electrical couplings between the first and second input terminals and the communications circuit through the first and second signal conductors are free of the test switch, the battery, and the at least one light emitting diode.

31. A method according to claim 27 wherein the at least one diode is visible from a surface of the communications device.

32. A method according to claim 27 wherein the at least one light emitting diode comprises two parallel connected light emitting diodes connected in opposing directions.

33. A method according to claim 27 wherein the at least one light emitting diode comprises at least a first light emitting diode connected along the first signal conductor in series between the first input terminal and the communications circuit.

34. A method according to claim 33 wherein the at least one light emitting diode comprises at least a second light emitting diode connected along the second signal conductor in series between the second input terminal and the communications circuit.

35. A method according to claim 27 wherein the first and second signal input terminals are configured to provide a coupling to a communications port.

36. A method according to claim 27 wherein the first and second input terminals are configured to be coupled to a communications port according to the RJ11 standard.

37. A method according to claim 27 wherein the first and second input terminals are configured to provide a detachable electrical coupling with respective first and second conductors of a communications port.

38. A method according to claim 27 wherein the communications circuit provides a communications interface for at least one of audio telephone communications, facsimile communications, caller identification communications, computer communications, modem communications, alarm system communications, and/or local area network communications.

39. A method according to claim 27 further comprising:
opening an isolation switch between the first input terminal and the test switch while electrically coupling the first and second signal conductors through the test switch thereby isolating the first input terminal from the test switch.

* * * * *